UNITED STATES PATENT OFFICE.

CORNELIUS KIMPLEN, OF CHICAGO, ILLINOIS.

PREPARED FUEL.

SPECIFICATION forming part of Letters Patent No. 392,869, dated November 13, 1888.

Application filed October 22, 1887. Serial No. 253,123. (Specimens.)

*To all whom it may concern:*

Be it known that I, CORNELIUS KIMPLEN, residing at Chicago, in the county of Cook and State of Illinois, and a citizen of the United States, have invented a new and useful Improved Prepared Fuel, of which the following is a specification.

The object of this invention is to utilize coal-dust, coal-screenings, or other fine coal for fuel purposes by preparing and compressing it into blocks or cakes of suitable dimensions to be used as they come from the press, or of such size that they may be broken into fragments suitable for such use.

In preparing the coal dust or screenings to be pressed into blocks I follow the process or method described in my first application of even date herewith, Serial No. 253,122—that is to say, I take adhesive clay (potter's clay preferred) and mix it with water until the mixture is of about the consistency of cream, or sufficient to coat the particles of coal dust or screenings, and thoroughly mix such mixture of clay-water with the coal-screenings and then dry them. When dry, I mix with the clay-coated particles of coal-dust about one per cent. (more or less) of flour-rosin and thoroughly incorporate said rosin with the mass, and then heat it to about 212° Fahrenheit, and while hot I compress it, under heavy pressure by any suitable hydraulic or other press of sufficient power, into cakes of any desired form or shape for immediate use by the use of suitable molds; or, if desired, it may be pressed into large cakes to be afterward broken into proper fragments.

I am aware that it has been proposed to make an artificial fuel from lumps of coal-dust and clay coated with pitch, tar, asphaltum, rosin, or other waterproofing material. A mixture of coal-dust and clay formed into lumps and immersed in a coating-liquid composed of rosin dissolved in benzine has also been proposed as fuel. Coal-dust mixed with clay and turpentine without heat and without molding has also been proposed as fuel. These, however, I do not claim, and my invention is distinguished therefrom in requiring the employment of comparatively a small quantity of clay, which, when mixed with water, is applied as a coating to the coal-dust; and the clay-coated coal-dust, after drying, is thoroughly mixed with finely-pulverized rosin and molded while hot, thus securing a more intimate mixture of the coal-dust and rosin with greater cohesion of the particles, so that the molded block or lump of artificial fuel will maintain its integrity until consumed.

What I claim as new, and desire to secure by Letters Patent, is—

The improved artificial fuel herein described, consisting of molded blocks composed of clay-coated coal-dust mixed throughout with pulverized rosin, substantially as described.

CORNELIUS KIMPLEN.

Witnesses:
ALBERT H. ADAMS,
L. L. BOND.